(12) United States Patent
Sasaki et al.

(10) Patent No.: US 7,698,941 B2
(45) Date of Patent: *Apr. 20, 2010

(54) SENSING UNIT AND METHOD OF MAKING SAME

(75) Inventors: Yoshitaka Sasaki, Santa Clara, CA (US); Tatsushi Shimizu, Hong Kong (CN); Takehiro Horinaka, Milpitas, CA (US); Kazuo Ishizaki, Milpitas, CA (US); Shigeki Tanemura, Santa Clara, CA (US)

(73) Assignees: Headway Technologies, Inc., Milpitas, CA (US); SAE Magnetics (H.K.) Ltd., Shatin (CN)

( * ) Notice: Subject to any disclaimer, the term of this patent is extended or adjusted under 35 U.S.C. 154(b) by 157 days.

This patent is subject to a terminal disclaimer.

(21) Appl. No.: 11/812,630

(22) Filed: Jun. 20, 2007

(65) Prior Publication Data

US 2008/0313882 A1 Dec. 25, 2008

(51) Int. Cl.
*G01P 15/10* (2006.01)
*G01P 15/11* (2006.01)
*G01P 15/12* (2006.01)

(52) U.S. Cl. ............... 73/514.29; 73/514.31; 73/514.33
(58) Field of Classification Search ............. 73/514.01, 73/514.16, 514.31, 514.39, 514.33, 862.59, 73/862.41
See application file for complete search history.

(56) References Cited

U.S. PATENT DOCUMENTS

| | | | |
|---|---|---|---|
| 5,739,431 A * | 4/1998 | Petri | 73/509 |
| 5,763,783 A * | 6/1998 | Asada | 73/514.31 |
| 7,132,722 B2 * | 11/2006 | Ohashi | 257/415 |
| 7,443,158 B2 * | 10/2008 | Oohashi et al. | 324/207.22 |
| 2008/0314146 A1 * | 12/2008 | Sasaki et al. | 73/514.01 |

* cited by examiner

*Primary Examiner*—Helen C. Kwok
(74) *Attorney, Agent, or Firm*—Oliff & Berridge PLC

(57) ABSTRACT

In a sensing unit according to the present invention, a spring portion having a support portion and a movable portion is conductive. A signal of a sensor portion provided on the movable portion of the spring portion is transmitted via the spring portion. Hence, the sensing unit according to the present invention has a simple constitution with a small number of components, and a wire does not necessarily have to be provided for each sensor portion. As a result, a reduction in manufacturing cost, simplification of the manufacturing process, and so on are achieved.

7 Claims, 11 Drawing Sheets

Prior Art

SENSING UNIT AND METHOD OF MAKING SAME

BACKGROUND OF THE INVENTION

1. Field of the Invention

The present invention relates to a sensing unit and a method of making the sensing unit.

2. Description of the Related Art

A silicon acceleration sensor employing MEMS technology is known from the prior art as an acceleration sensor (accelerometer).

A sensing unit of this silicon acceleration sensor is typically made through a process such as that shown in FIG. 11. More specifically, when making a sensing unit 110 of the silicon acceleration sensor, first, as shown in (a) of FIG. 11, a photomask 102 having a pattern of stripes arranged in parallel is formed on a silicon substrate 100. Deep etching (at an etching depth of 25 to 30 μm) using the photomask 102 is then performed, thereby forming a plurality of parallel trenches 104. Then, as shown in (b) of FIG. 11, an $SiO_2$ film 106 is deposited on an upper surface of the substrate 100 and an inner wall surface of the trenches 104. Next, as shown in (c) of FIG. 11, a bottom surface part of the trenches 104 is partially removed by isotropic etching such that adjacent trenches 104 are connected to each other by the bottom surface part. As a result, a cantilever part 108 capable of reciprocating in a single parallel direction (in other words, the arrangement direction) to the surface direction of the substrate 100 is formed between the adjacent trenches 104.

In the sensing unit 110 having the structure shown in FIG. 11, acceleration is measured on the basis of variation in electrostatic capacity accompanying oscillation of the cantilever part (movable part) 108.

SUMMARY OF THE INVENTION

However, when sensor portions are provided in a conventional sensing unit such as that described above, wiring must be provided for each sensor portion, leading to an increase in the number of components and a more complicated structure.

The present invention has been designed to solve this problem, and an object thereof is to provide a sensing unit having a simplified structure and a method for making the sensing unit.

A sensing unit according to the present invention comprises: a spring portion formed from a conductive material and having a support portion provided on a substrate and a movable portion supported by the support portion so as to be capable of floating relative to the substrate; and a sensor portion provided on the movable portion of the spring portion, for detecting displacement in the movable portion and transmitting a signal relating to the displacement via the spring portion.

In this sensing unit, the spring portion having the support portion and the movable portion is conductive, and a signal of the sensor portion provided on the movable portion of the spring portion is transmitted via the spring portion. Hence, the sensing unit according to the present invention has a simple constitution with a small number of components, and a wire does not necessarily have to be provided for each sensor portion. As a result, a reduction in manufacturing cost, simplification of the manufacturing process, and so on are achieved.

In another aspect, a recessed portion may be formed in the substrate, the support portion of the spring portion may be positioned on an edge portion of the recessed portion, and the movable portion of the spring portion may be positioned above the recessed portion in a flat coil shape. In this case, the movable portion is capable of oscillating in any direction parallel to the substrate surface. Moreover, the movable portion is capable of oscillating in the thickness direction of the substrate such that the amplitude of a center side end portion thereof reaches a maximum. As a result, the sensing unit has a higher degree of freedom in terms of the measurement direction than a conventional sensing unit that oscillates in only one direction.

In another aspect, the substrate may be held so as to extend in a vertical direction, and in another aspect, the substrate may be held so as to extend in a horizontal direction. By determining the extension direction of the substrate appropriately, a sensing unit that is highly sensitive in a desired direction can be obtained.

In another aspect, two end portions of the movable portion may be supported by a pair of the support portions, and a part of the movable portion may extend in an arrangement direction of the pair of support portions and oscillate in the arrangement direction.

In another aspect, the spring portion may be formed by plating. In this case, a thinner movable portion than that of a case in which the movable portion of the spring portion is formed by deep etching can be formed.

In another aspect, the sensor portion may be constituted by a GMR sensor. In this case, the sensor portion can be reduced in size, and a corresponding reduction in the size of the sensing unit can be achieved.

A method of making a sensing unit according to the present invention is a method of making a sensing unit having: a spring portion having a support portion provided on a substrate and a movable portion supported by the support portion so as to be capable of floating relative to the substrate; and a sensor portion provided on the movable portion of the spring portion, for detecting displacement in the movable portion and transmitting a signal relating to the displacement via the spring portion. The method comprises the steps of: preparing a substrate on which a first region for forming the movable portion of the spring portion is lower than a second region for forming the support portion; burying the first region in a resist layer such that the substrate is made flat; forming a plating layer that is to become the spring portion such that a part that is to become the movable portion is positioned on the resist layer in the first region and a part that is to become the support portion is positioned in the second region; forming the sensor portion in the part of the plating layer that is to become the movable portion; and removing the resist layer.

In this method of making a sensing unit, the conductive spring portion is formed by plating. The sensor portion for transmitting signals via the spring portion is formed in the part of the spring portion that is to become the movable portion. Hence, according to the method of making a sensing unit of the present invention, there is no need to provide a wire for each sensor portion, and a sensing unit having a simple constitution and a small number of components can be obtained. As a result, a reduction in the cost of making the sensing unit, simplification of the manufacturing process, and so on are achieved.

DESCRIPTION OF THE PREFERRED EMBODIMENTS

Preferred embodiments of the present invention will be described in detail below with reference to the attached drawings. Note that identical or similar elements have been allocated identical reference symbols, and duplicate description thereof has been omitted.

A sensing unit used in an acceleration sensor will be described below as a sensing unit according to an embodiment of the present invention. This sensing unit is capable of detecting acceleration applied to the sensing unit by transmitting a displacement-related signal to a predetermined control portion.

First Embodiment

Figure 1:
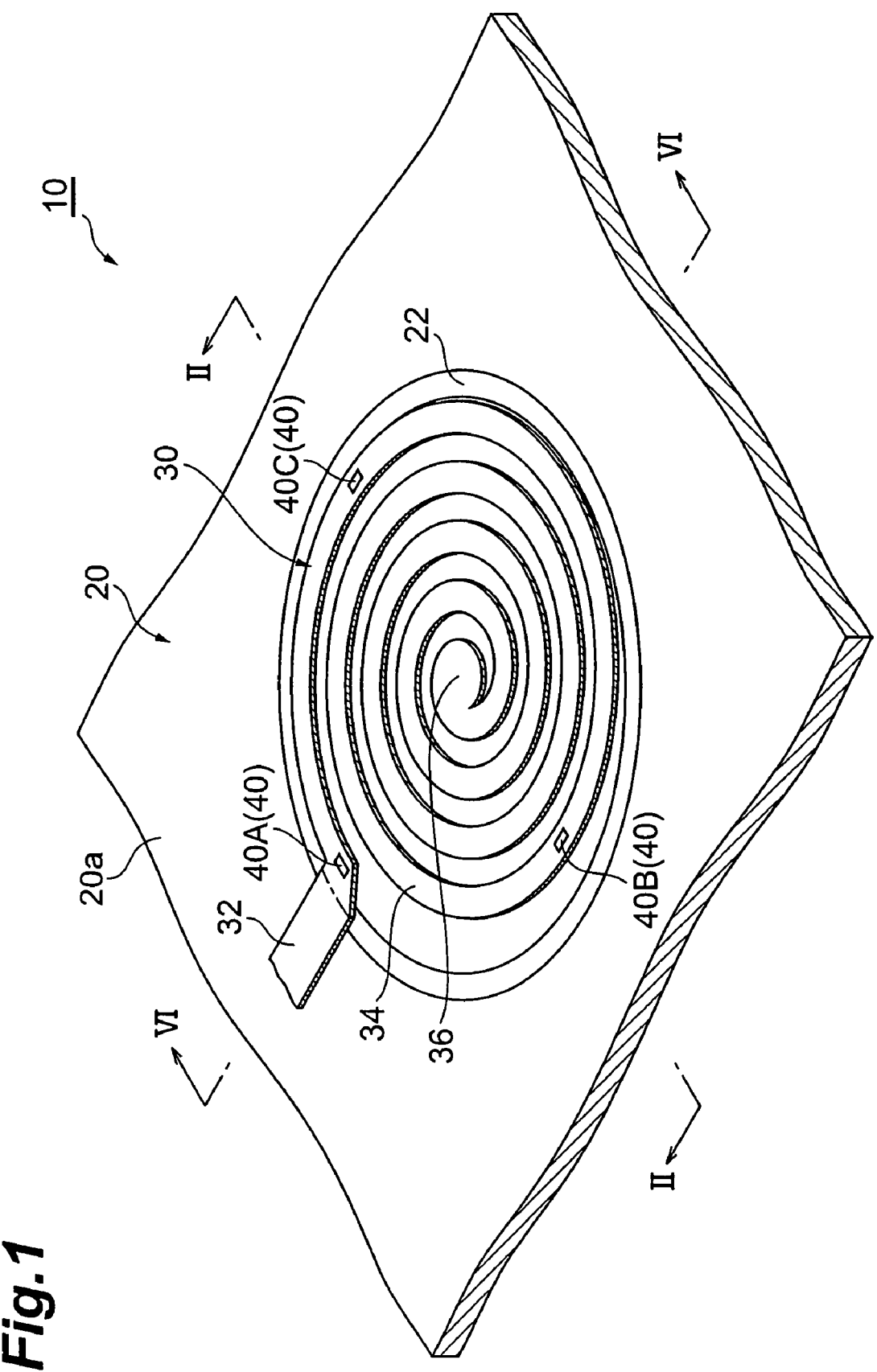
FIG. 1 is a schematic perspective view showing a sensing unit according to a first embodiment of the present invention.
Figure 2:
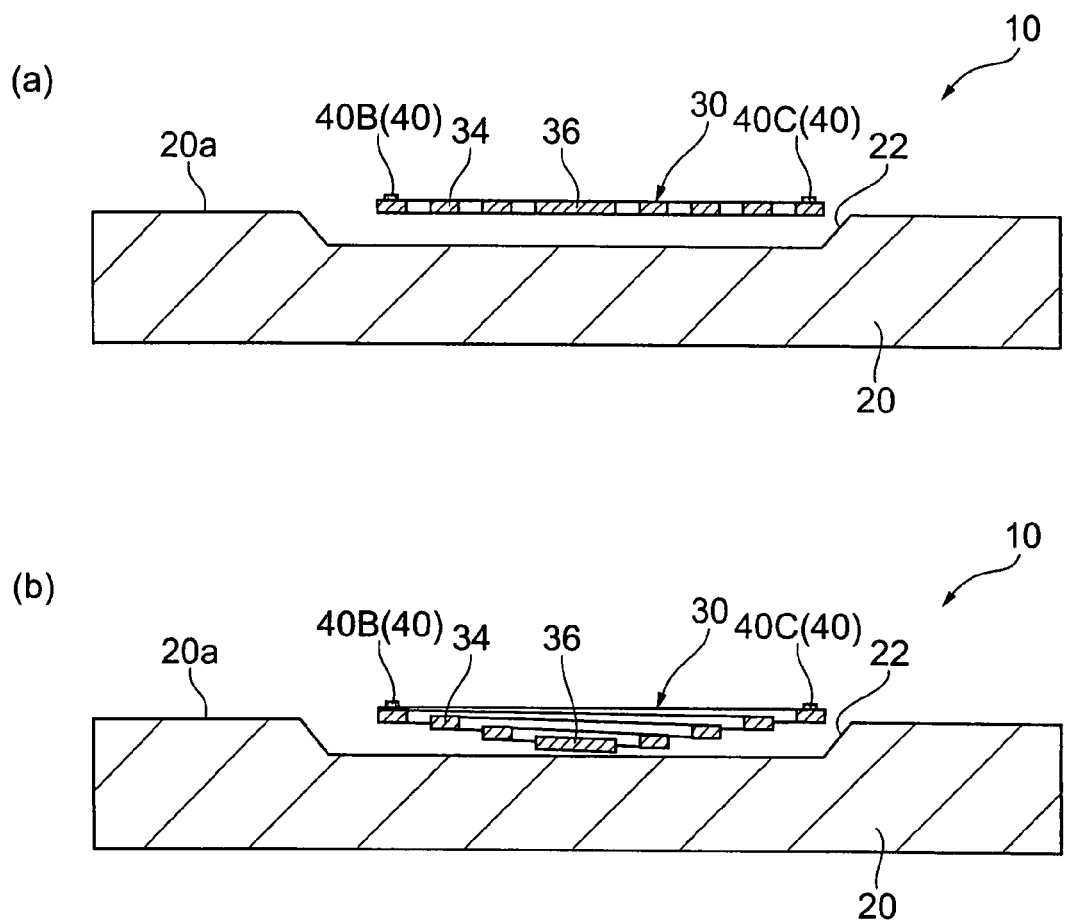
FIG. 2 is a sectional view taken along a line II-II of the sensing unit shown in FIG. 1.

FIG. 1 is a schematic perspective view showing a sensing unit 10 according to a first embodiment of the present invention. FIG. 2 is a sectional view taken along a line II-II of the sensing unit 10 shown in FIG. 1, (a) showing a non-elongated state and (b) showing an elongated state. As shown in FIGS. 1 and 2, the sensing unit 10 comprises a substrate 20 and a spring portion 30 provided on the substrate 20.

The substrate 20 is formed from $Al_2O_3$, for example, and a surface 20a thereof is flat. A hole (recessed portion) 22 having a substantially circular cross-section is provided in the surface 20a of the substrate 20. The depth of the hole 22 is set at approximately 0.5 to 3.0 μm when shallow, and approximately 3.0 to 10 μm when deep, for example.

Figure 3:
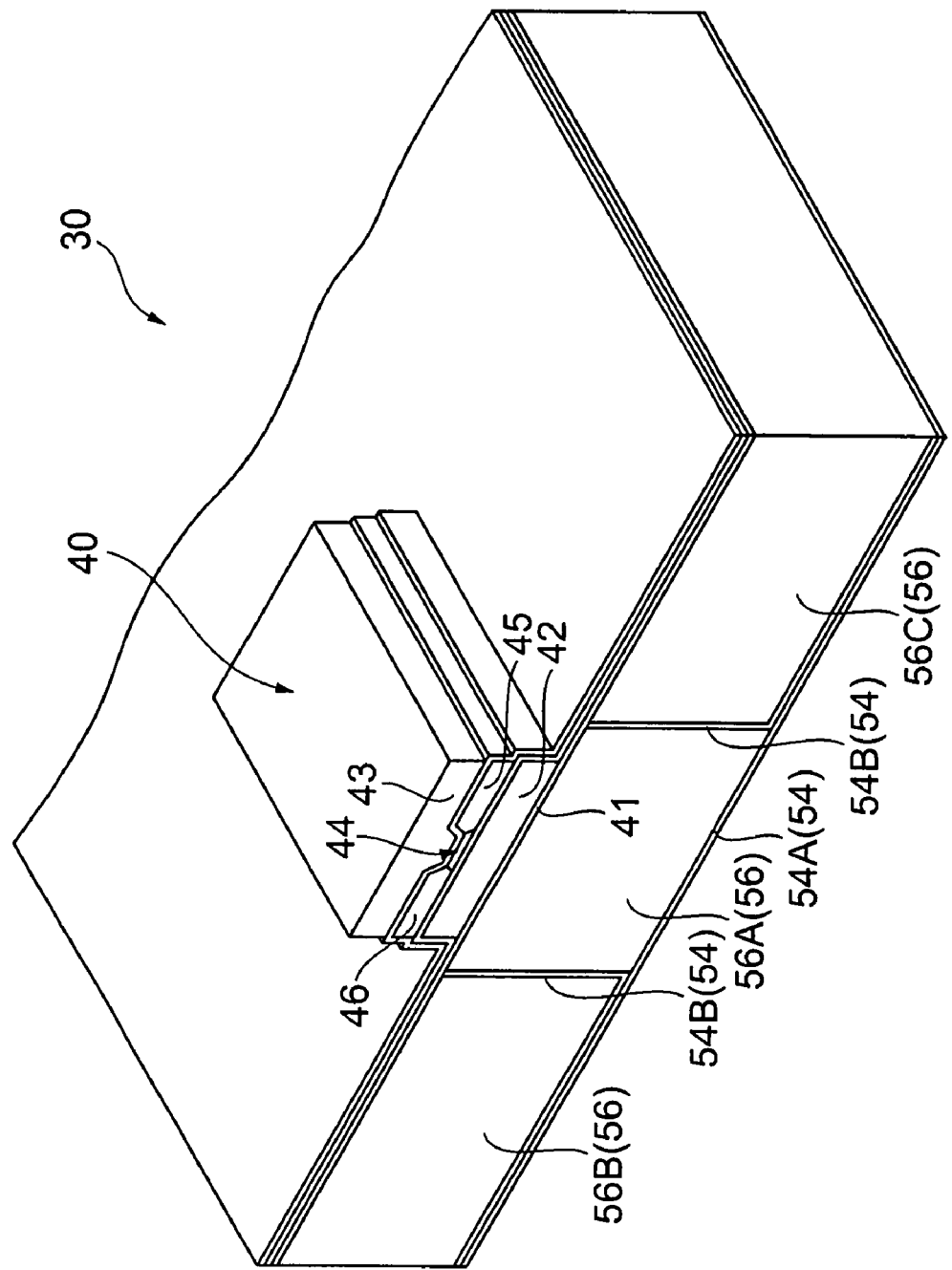
FIG. 3 is a view showing the schematic constitution of a sensor portion formed on a plating layer.

The spring portion 30 is a thin film member extending parallel to the substrate surface 20a of the substrate 20, and is formed by subjecting a conductive material such as Cu or Ni to plating. The spring portion 30 is constituted by a support portion 32 and a movable portion 34. Further, as shown in FIG. 3, the spring portion 30 is constituted such that a plating layer 56 is divided horizontally into three regions (56A, 56B, 56C) by insulating film 54.

The support portion 32 of the spring portion 30 is a strip-form part positioned on the edge of the hole 22, and extends so as to overhang the hole 22. The movable portion 34 of the spring portion 30 is provided continuously from the overhanging end portion of the support portion 32, and is positioned above the hole 22 in the substrate 20. The movable portion 34 has a flat coil shape covering the entire hole 22, and orbits the central portion of the hole 22 a plurality of times in spiral form.

In the spring portion 30 having the constitution described above, the movable portion 34 is supported floatably above the hole by the support portion 32, and is formed in a shape (i.e. a flat plate shape) and from a material (i.e. a metallic material such as Cu or Ni) that make it highly susceptible to elastic deformation. Hence, the movable portion 34 is capable of oscillating in the surface direction of the substrate surface 20a (all directions parallel to the substrate surface), and capable of oscillating (elongating) in the thickness direction of the substrate 20, as shown in (b) of FIG. 2.

A weighted portion 36 having a greater width than the other parts of the movable portion 34 is formed on a center side end portion of the movable portion 34 of the spring portion 30. By providing the weighted portion 36 having a comparatively large volume on the center side end portion in this manner, an increase in the amount of oscillation of the movable portion 34 is achieved. If necessary, a projection may be provided on the upper surface or lower surface of the weighted portion 36 to achieve a greater increase in weight and a corresponding increase in the amount of oscillation of the movable portion 34.

Furthermore, the movable portion 34 of the spring portion 30 is provided with three sensor portions 40 (40A to 40C). The sensor portions 40 are GMR sensors (giant magneto-resistive sensors) that are mounted integrally on the upper surface of the movable portion 34. In the sensor portions 40, an electric resistance value varies when the movable portion 34 displaces (expands or contracts) in a specific direction, and the amount of displacement (amount of oscillation) and displacement direction (oscillation direction) of the movable portion 34 are detected from this resistance variation.

Each sensor portion 40 is structured as shown in FIG. 3, for example. FIG. 3 is a view showing the schematic constitution of the sensor portion 40 formed on the plating layer 56. The sensor portion 40 has a sandwich structure in which a bottom shield layer 42 and a top shield layer 43 made of an Fe—Ni alloy (permalloy) are formed on the plating layer 56 via an insulating film 41, and a junction portion 44 is sandwiched therebetween. A pair of electrode portions 45, 46 is formed so as to sandwich the junction portion 44 from the left and right. Although not shown in the drawing, the electrode portions 45, 46 are electrically connected to different plating layers 56A, 56B, 56C, respectively.

Here, as shown in FIG. 1, the sensor portion 40A of the three sensor portions 40 is provided on the movable portion 34 in a position near the support portion 32. Displacement of the movable portion 34 is greatest in this position, and therefore, by providing the sensor portion 40A in this position, slight oscillation of the movable portion 34 can be detected, enabling an improvement in the measurement precision of the sensor portions 40.

Each sensor portion 40 transmits an electric resistance value, which serves as a displacement-related signal, to a control portion, not shown in the drawing, via the conductive movable portion 34.

Further, the sensor portions 40 are preferably disposed on the end portion side in the width direction of the movable portion 34 of the spring portion 30, rather than in the central portion. The reason for this is that when the movable portion 34 oscillates so as to buckle partially, the end portion thereof expands and contracts more than the central portion, and therefore slight expansion and contraction can be detected, enabling an improvement in the measurement precision of the sensor portions 40.

In the sensing unit 10, the movable portion 34 of the spring portion 30 is supported floatably above the hole formed in the substrate 20. Hence, the movable portion 34 is capable of oscillating in any direction parallel to the substrate surface 20a. The movable portion 34 is also capable of oscillating in the thickness direction of the substrate such that the amplitude of the center side end portion thereof reaches a maximum. The sensor portions 40 are provided on the movable portion 34. Thus, the sensing unit 10 has a greater degree of freedom in terms of the measurement direction than a conventional sensing unit that oscillates in only one direction.

Further, the spring portion 30 is made of a conductive material, and therefore the spring portion 30 can be used as a signal transmission path of the sensor portions 40. In other words, the sensor portions 40 can be disposed in the sensing unit 10 without providing separate wiring. Thus, a simple constitution with a small number of components is realized, enabling a reduction in manufacturing cost and simplification of the manufacturing process. In the embodiment described above, three signal transmission paths (i.e. the plating layer 56A, the plating layer 56B, and the plating layer 56C) are provided on the spring portion 30, and two of these signal transmission paths are used by the sensor portions 40.

Figure 11:
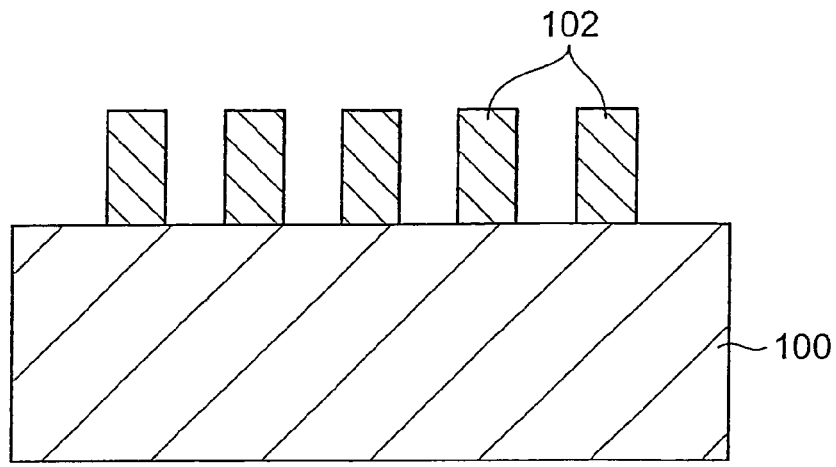
FIG. 11 is a view showing a procedure for making a sensing unit according to the prior art.
Figure 11:
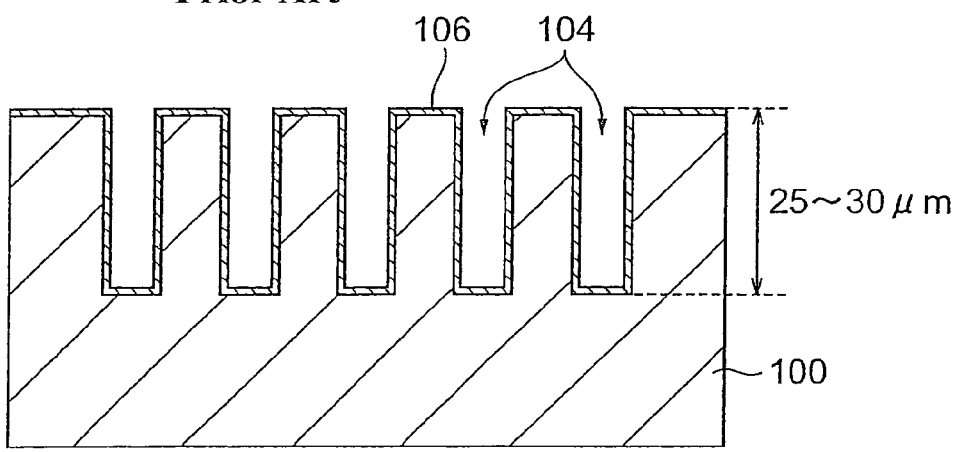
Figure 11:
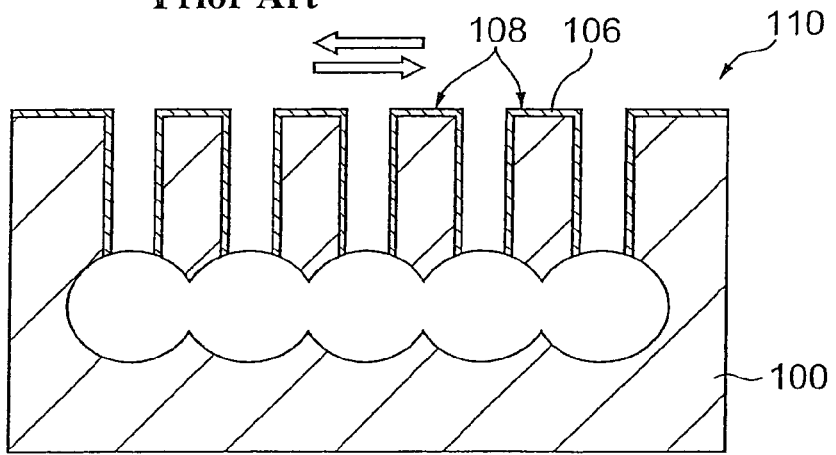

Furthermore, the insulating film 54 included in the spring portion 30 may be used as a capacitor, and a capacitance bridge may be formed by this capacitor. Further, the spring portion 30 is formed by plating, and therefore the movable portion 34 can be formed more thinly than in a case where the movable portion of the spring portion is formed by deep etching (as in the sensing unit 110 shown in (c) of FIG. 11).

Furthermore, the sensor portions 40 are constituted by GMR sensors, and therefore the sensor portions can be reduced in size, enabling a corresponding reduction in the size of the sensing unit 10. Moreover, the movable portion 34 is provided with three sensor portions 40, enabling diversification of the measurement direction of the sensing unit (for example, measurement in two axial directions or three axial directions). Furthermore, an even higher degree of measurement precision can be realized by determining a difference in the amount of displacement or the average amount of displacement from the detection signals of the sensor portions 40.

Note that the movable portion 34 takes a flat plate form, and can therefore oscillate easily in the thickness direction of the substrate 20, as shown in (b) of FIG. 2. As a result, the sensitivity of the sensing unit 10 in the thickness direction is improved. Accordingly, a sensing unit 10 that is highly sensitive to horizontal direction oscillation can be obtained by holding the sensing unit 10 such that the substrate 20 extends in a vertical direction. Furthermore, by holding the sensing unit 10 such that the substrate 20 extends in a horizontal direction, a sensing unit 10 that is highly sensitive to vertical direction oscillation can be obtained.

Next, a procedure for making the sensing unit 10 described above will be described with reference to FIGS. 4 to 6.

Figure 4:
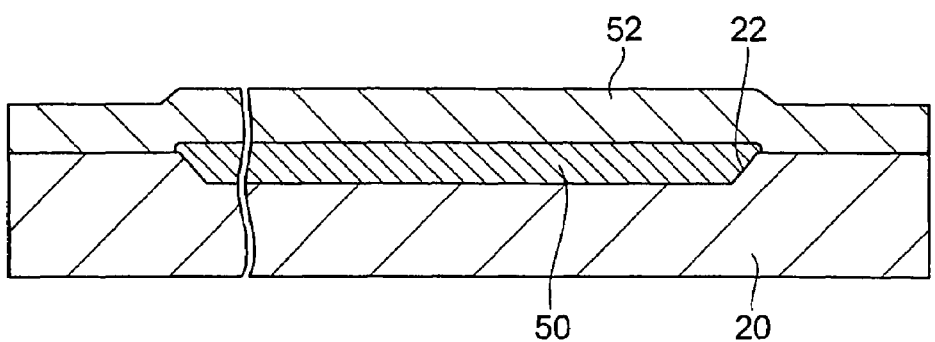
FIG. 4 is a sectional view showing a procedure for making the sensing unit, taken along the line II-II of FIG. 1.
Figure 4:
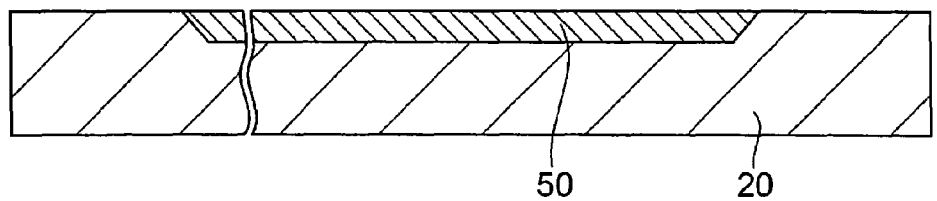
Figure 4:
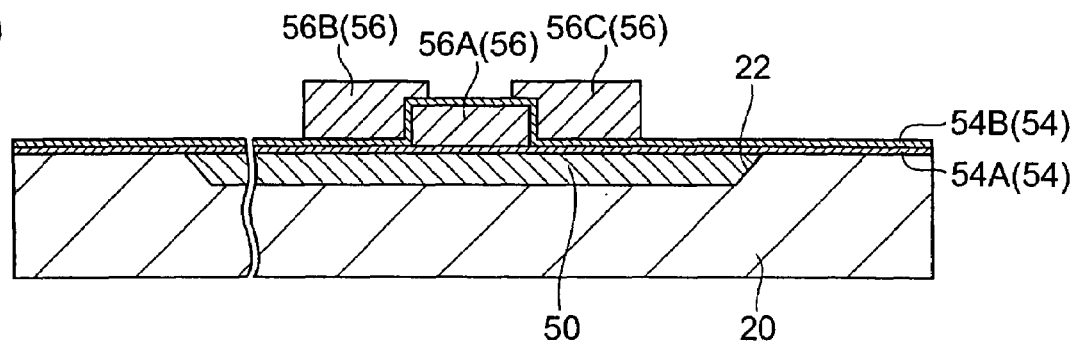
Figure 4:
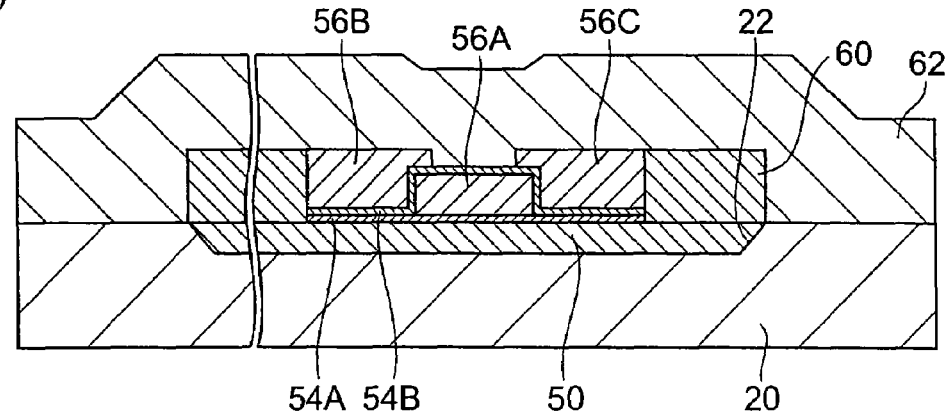
Figure 5:
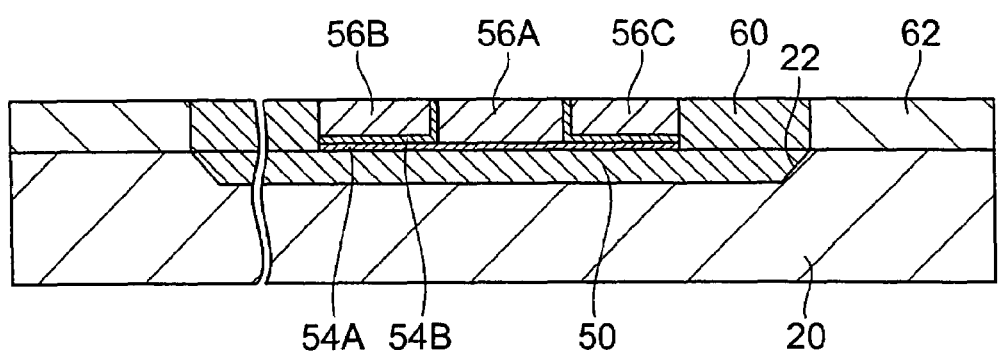
FIG. 5 is a sectional view showing a procedure for making the sensing unit, taken along the line II-II of FIG. 1.
Figure 5:
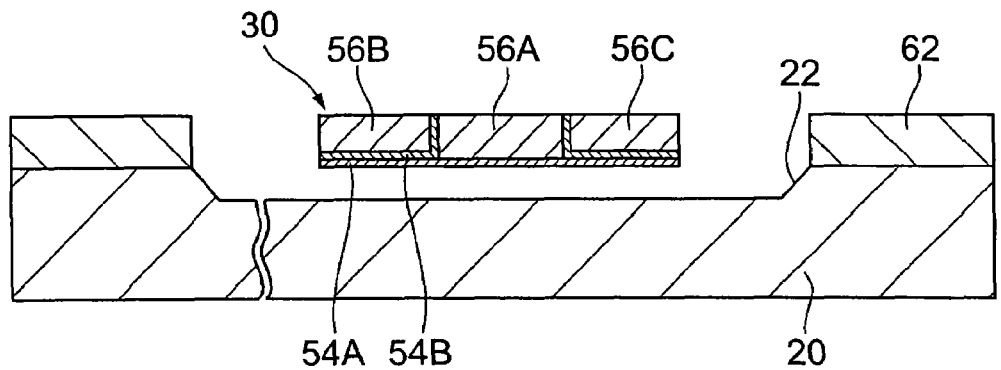
Figure 5:
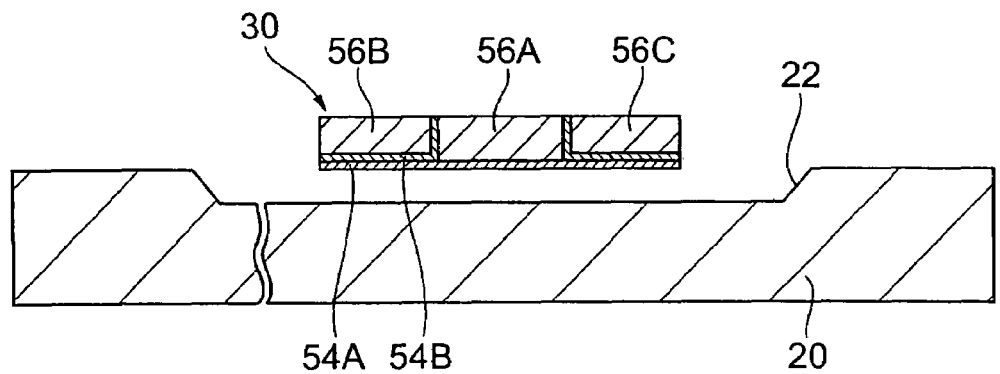
Figure 6:
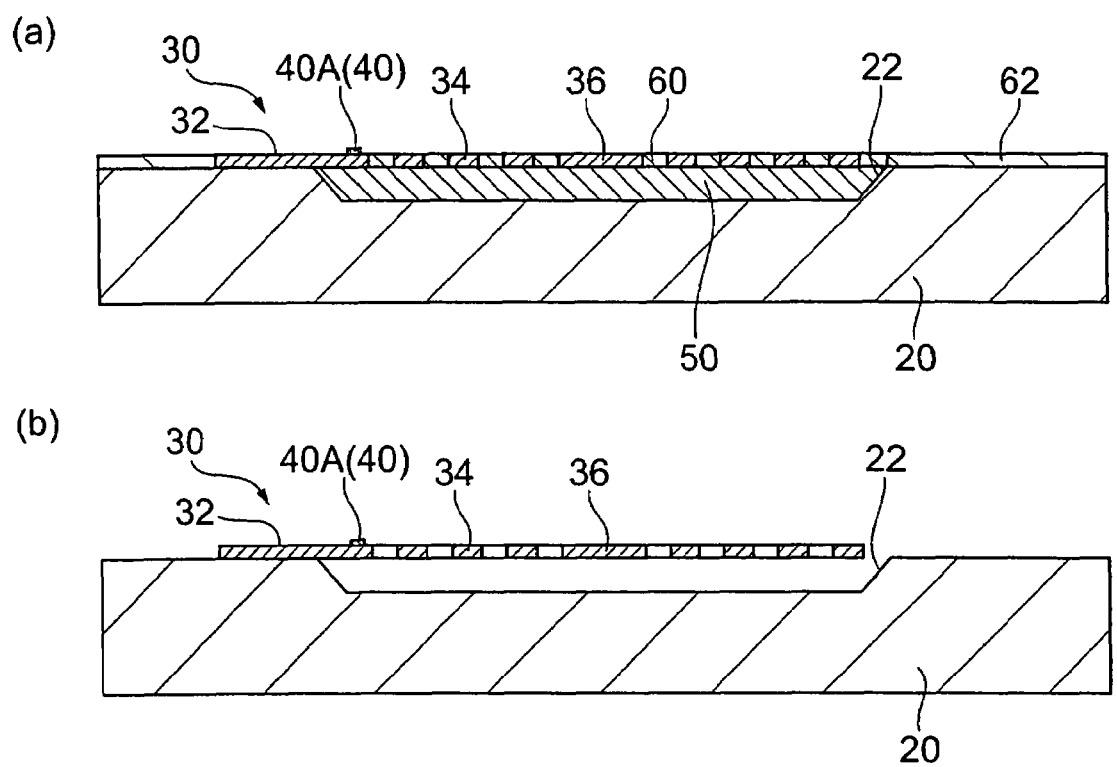
FIG. 6 is a sectional view showing a procedure for making the sensing unit, taken along a line VI-VI of FIG. 1.

Here, FIG. 4 is a sectional view showing a procedure for making the sensing unit 10, taken along the line II-II of FIG. 1, (a) to (d) thereof showing cross-sections of the sensing unit 10 at various processing stages. FIG. 5 is also a sectional view showing a procedure for making the sensing unit 10, taken along the line II-II of FIG. 1, (a) to (c) thereof showing cross-sections of the sensing unit 10 at various processing stages. FIG. 6 is a sectional view showing a procedure for making the sensing unit 10, taken along a line VI-VI of FIG. 1, (a) and (b) thereof showing cross-sections of the sensing unit 10 at various processing stages.

When making the sensing unit 10, first the $Al_2O_3$ substrate 20 is prepared in a predetermined shape. The hole 22 having a circular cross-section is formed in the substrate 20 in a first region for forming the movable portion 34 of the spring portion 30. In other words, the hole 22 (the first region) has a lower surface height than an edge portion (second region) of the hole 22 on which the support portion 32 is formed.

Next, photoresist (a resist layer) 50 is applied so as to bury the hole 22 in the first region completely, whereby the substrate 20 is flattened. An $Al_2O_3$ layer 52 is then deposited on the entire surface of the substrate 20 so as to cover the photoresist 50 (see (a) of FIG. 4).

Next, the hole 22 is exposed by performing polishing up to the position of the substrate 20 using chemical-mechanical polishing (CMP). As a result, the hole 22 formed in the substrate 20 remains buried by the photoresist 50 such that the substrate 20 is flat (see (b) of FIG. 4).

Next, an $Al_2O_3$ insulating film 54A is deposited on the flat substrate 20, and a first plating layer 56A having a rectangular cross-section is plate-formed into a similar shape to the spring portion 30 described above. Next, an $Al_2O_3$ insulating film 54B is deposited on the surface of the substrate 20 so as to cover the first plating layer 56A, and substantially rectangular second and third plating layers 56B, 56C are plate-formed on either side of the first plating layer 56A so as to be higher than the first plating layer 56A (see (c) of FIG. 4). These plating layers 56 (56A, 56B, 56C) eventually become the spring portion 30 described above. Accordingly, the plating layers 56 are formed such that the part that is to become the support portion 32 is positioned on the edge portion (second region) of the hole 22 and the part that is to become the movable portion 34 is positioned on the photoresist 50 within the hole 22 (first region).

Next, the $Al_2O_3$ insulating film is removed by etching from all parts other than the formation region of the plating layers 56. Further, photoresist (a resist layer) 60 is formed in the region corresponding to the hole 22 and covered with an $Al_2O_3$ layer 62 from above (see (d) of FIG. 4).

Next, the $Al_2O_3$ layer 62, photoresist 60, and plating layers 56B, 56C are polished using CMP to a position in which the first plating layer 56A is exposed (see (a) of FIG. 5).

Next, the photoresist 60 and the photoresist 50 formed in the region corresponding to the hole 22 in the substrate 20 are removed to form a space around and below the plating layers 56 (see (b) of FIG. 5). As a result, the spring portion 30 constituted by the three plating layers 56A, 56B, 56C, which are divided by the $Al_2O_3$ insulating films 54 (54A, 54B), is formed.

Finally, the $Al_2O_3$ layer 62 on the substrate 20 is selectively removed by etching, whereby manufacture of the spring portion 30 of the sensing unit 10 is complete (see (c) of FIG. 5).

The sensor portions 40 are formed at the stage shown in (a) of FIG. 5. More specifically, as shown in (a) of FIG. 6, when the plating layers 56 for forming the spring portion 30 are buried in the photoresist 60, 50 and the $Al_2O_3$ layer 62 such that the substrate surface is flat, the sensor portions 40 are formed on the plating layers 56 for forming the movable portion 34 via an insulating film 41.

After making the sensor portions 40, the photoresist 60 and the photoresist 50 formed in the region corresponding to the hole 22 in the substrate 20 are removed and the $Al_2O_3$ layer 62 on the substrate 20 is selectively removed by etching, as described above, whereby manufacture of sensing unit 10 is complete (see (b) of FIG. 6).

According to the manufacturing method described above, the spring portion 30 is divided into three conduction paths (namely, the first plating layer 56A, second plating layer 56B, and third plating layer 56C). When the spring portion 30 has a plurality of conduction paths and two of the conduction paths are selected appropriately, the signals of the sensor portions 40 are transmitted to the control portion via the spring portion 30 without providing separate wiring. Note that even when the spring portion is not divided into conduction paths (in other words, when the spring portion is constituted by only one plating layer), the signals of the sensor portions 40 can be transmitted simply by providing a single separate wire, and therefore, even in this case, a sensing unit having a simpler constitution and a smaller number of components than a conventional sensing unit having an insulating spring portion that requires a pair of wires is obtained.

Second Embodiment

Figure 7:
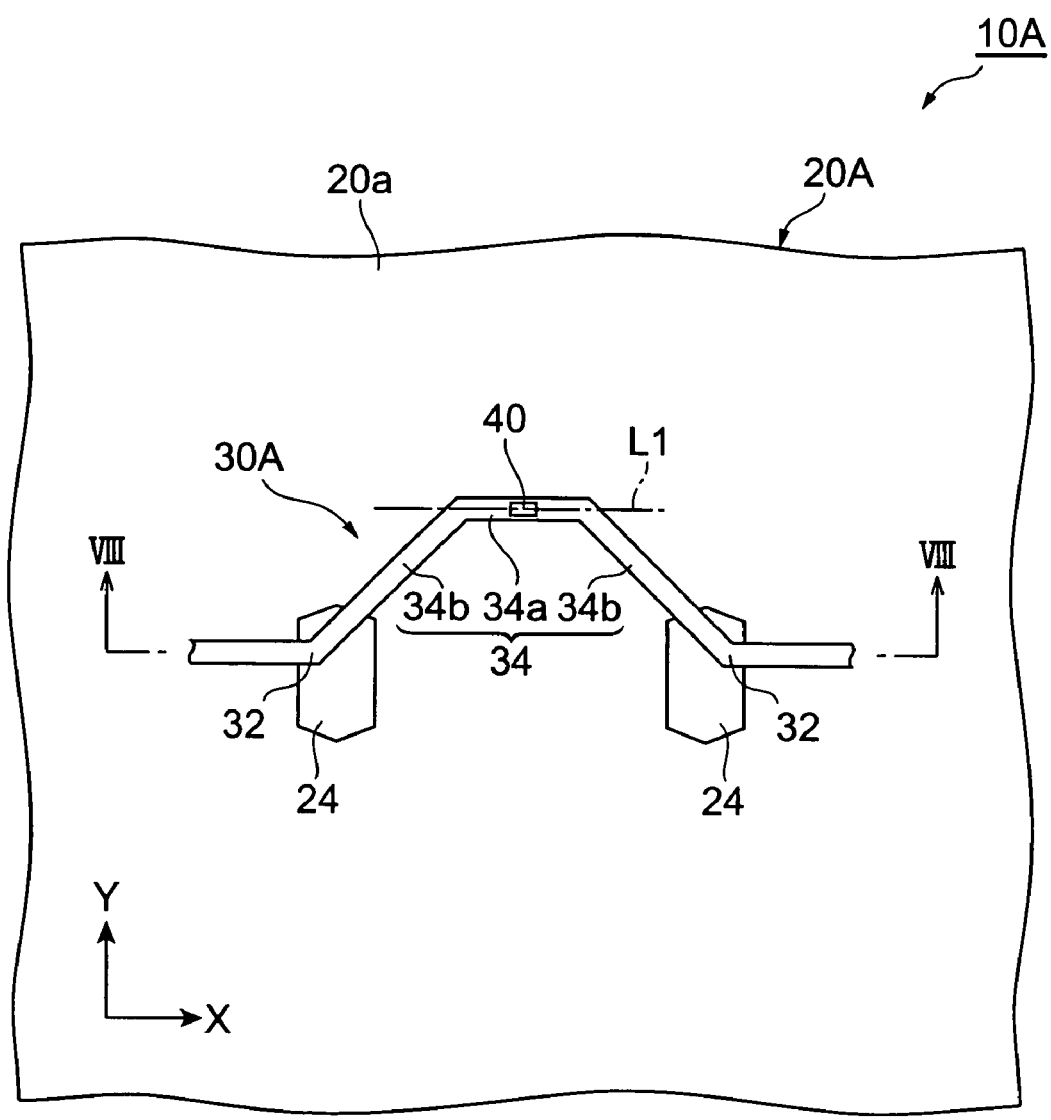
FIG. 7 is a schematic plan view showing a sensing unit according to a second embodiment of the present invention.

Next, a sensing unit 10A according to a second embodiment of the present invention will be described. FIG. 7 is a schematic plan view showing the sensing unit 10A.

As shown in FIG. 7, in the sensing unit 10A, two seating portions 24 (having a height of approximately 0.5 to 10 μm, for example) are provided on a substrate 20A, and a conductive spring portion 30A straddles the two seating portions 24. Similarly to the spring portion 30 described above, the spring portion 30A is a thin film member extending parallel to the substrate surface 20a of the substrate 20A, and is formed by subjecting a conductive material such as Cu or Ni to plating.

The spring portion 30A is constituted by a pair of support portions 32 provided on the seating portions 24 of the substrate 20A, and a movable portion 34 positioned therebetween. Hence, the formation region (first region) of the movable portion 34 of the spring portion 30A is lower than the formation region (second region) of the support portions 32.

The movable portion 34 of the spring portion 30A is constituted by a central portion 34a that extends along a virtual line L1 parallel to the arrangement direction of the pair of support portions 32, and connecting portions 34b extending on either side of the central portion 34a at an incline relative to the arrangement direction. Hence, in the spring portion 30A of the sensing unit 10A, the central portion 34a of the movable portion 34 is supported so as to be capable of oscillating in the arrangement direction of the support portions 32 (an X direction in FIG. 7).

A sensor portion 40 similar to the sensor portion described above is provided on the central portion 34a of the movable portion 34. The sensor portion 40 detects X direction oscillation in the central portion 34a of the movable portion 34.

The method of making the sensing unit 10A according to the second embodiment differs from that of the first embodiment only in that the employed substrate 20A is different. Here, FIG. 8 is a sectional view showing a procedure for making the sensing unit 10A, taken along the line VIII-VIII of FIG. 7, (a) to (d) thereof showing cross-sections of the sensing unit 10A at various processing stages.

When making the sensing unit 10A, first the $Al_2O_3$ substrate 20A is prepared in a predetermined shape. The seating portions 24 are provided on the surface 20a of the substrate 20A in the regions for forming the support portions 32 of the spring portion 30A (see (a) of FIG. 8). The seating portions 24 may be provided integrally by etching the substrate 20A, or may be deposited using a different material to the substrate material.

Figure 8:
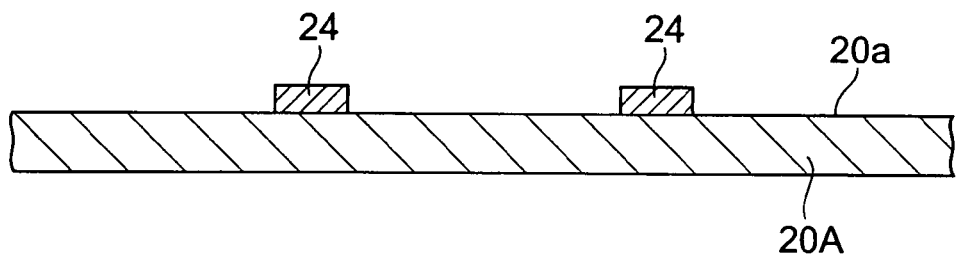
FIG. 8 is a sectional view showing a procedure for making the sensing unit, taken along a line VIII-VIII of FIG. 7.
Figure 8:
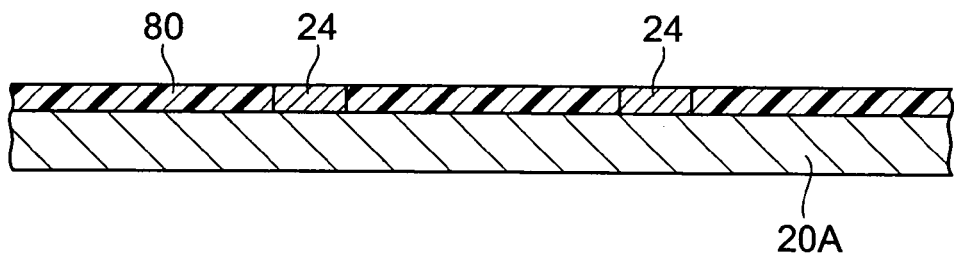
Figure 8:
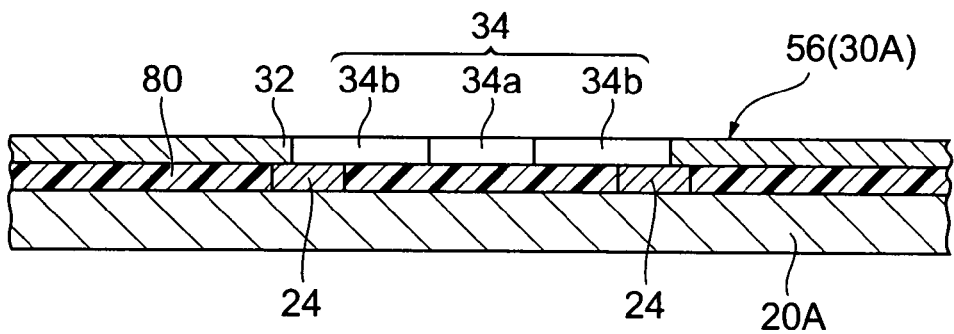
Figure 8:
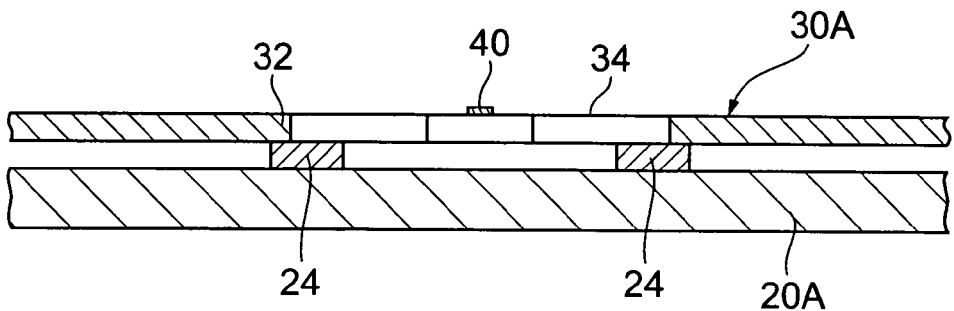

Next, the region for forming the movable portion 34 of the spring portion 30A (the remaining region after forming the seating portions) is buried in photoresist (a resist layer) 80 such that the substrate 20A is made flat (see (b) of FIG. 8). This flattening processing is performed similarly to that of the method for making the sensing unit 10, by covering the photoresist 80 with an $Al_2O_3$ layer, and then polishing the surface thereof using CMP until the upper end surfaces of the seating portions 24 are exposed.

Next, the plating layer 56 having a rectangular cross-section is formed on the flat substrate 20A in a similar shape to the spring portion 30A described above by plating (see (c) of FIG. 8). At this time, the plating layer 56 is formed such that the parts that are to become the support portions 32 are positioned on the seating portions 24, while the part that is to become the movable portion 34 is positioned on the photoresist 80.

Next, following a similar procedure to that of the method for making the sensing unit 10, the sensor portion 40 is formed on the part of the plating layer 56 corresponding to the central portion 34a of the movable portion 34, and the photoresist 80 is removed, thereby completing manufacture of the sensing unit 10A (see (d) of FIG. 8).

In the second embodiment described above, similarly to the first embodiment, the spring portion 30A of the sensing unit 10A is formed from a conductive material, and therefore the spring portion 30A can be used as a signal transmission path of the sensor portion 40. In other words, in the sensing unit 10A also, the sensor portion 40 can be disposed without providing separate wiring. Thus, a simple constitution with a small number of components is realized, enabling a reduction in manufacturing cost and simplification of the manufacturing process.

Third Embodiment

Figure 9:
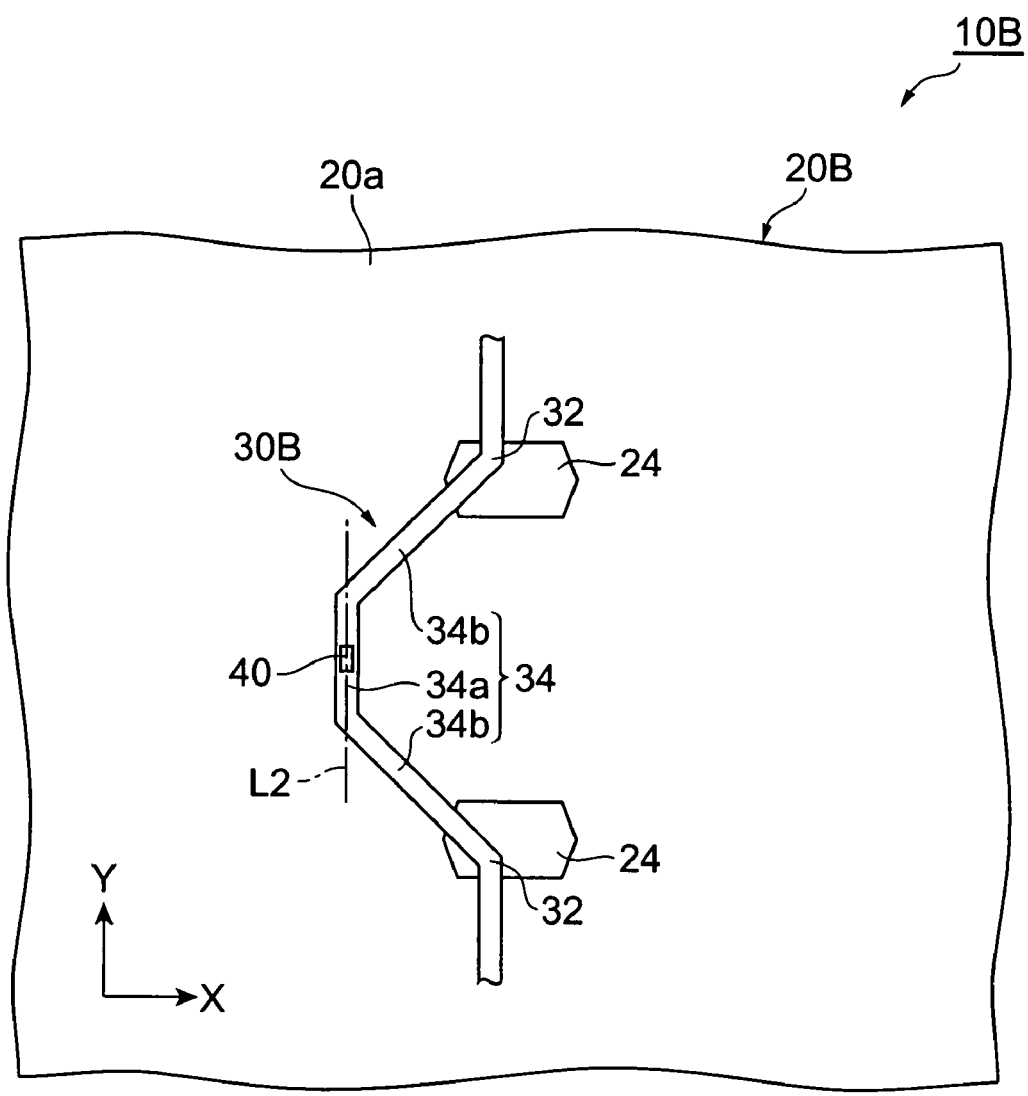
FIG. 9 is a schematic plan view showing a sensing unit according to a third embodiment of the present invention.

Next, a sensing unit 10B according to a third embodiment of the present invention will be described. FIG. 9 is a schematic plan view showing the sensing unit 10B.

As shown in FIG. 9, the sensing unit 10B has a similar constitution to the sensing unit 10A described above, and a spring portion 30B of the sensing unit 10B is formed by subjecting a conductive material to plating, similarly to the spring portions 30 and 30A. In the sensing unit 10B, the seating portions 24 of a substrate 20B are arranged in a Y direction orthogonal to the aforementioned X direction. The central portion 34a of the movable portion 34 of the spring portion 30B extends along a virtual line L2 parallel to the arrangement direction (Y direction) of the pair of support portions 32 provided on the seating portions 24. Hence, in the spring portion 30B of this sensing unit 10B, the central portion 34a of the movable portion 34 is supported so as to be capable of oscillating in the arrangement direction (the Y direction in FIG. 9) of the support portions 32.

Accordingly, the sensor portion 40 provided on the central portion 34a of the movable portion 34 detects Y direction oscillation in the central portion 34a of the movable portion 34.

The sensing unit 10B may be used alone or in combination with the sensing unit 10A. When both the sensing unit 10B and the sensing unit 10A are used, acceleration in all bearings on the X-Y plane of the substrates 20A, 20B can be detected from the detection signals of the sensor portion 40.

Fourth Embodiment

Figure 10:
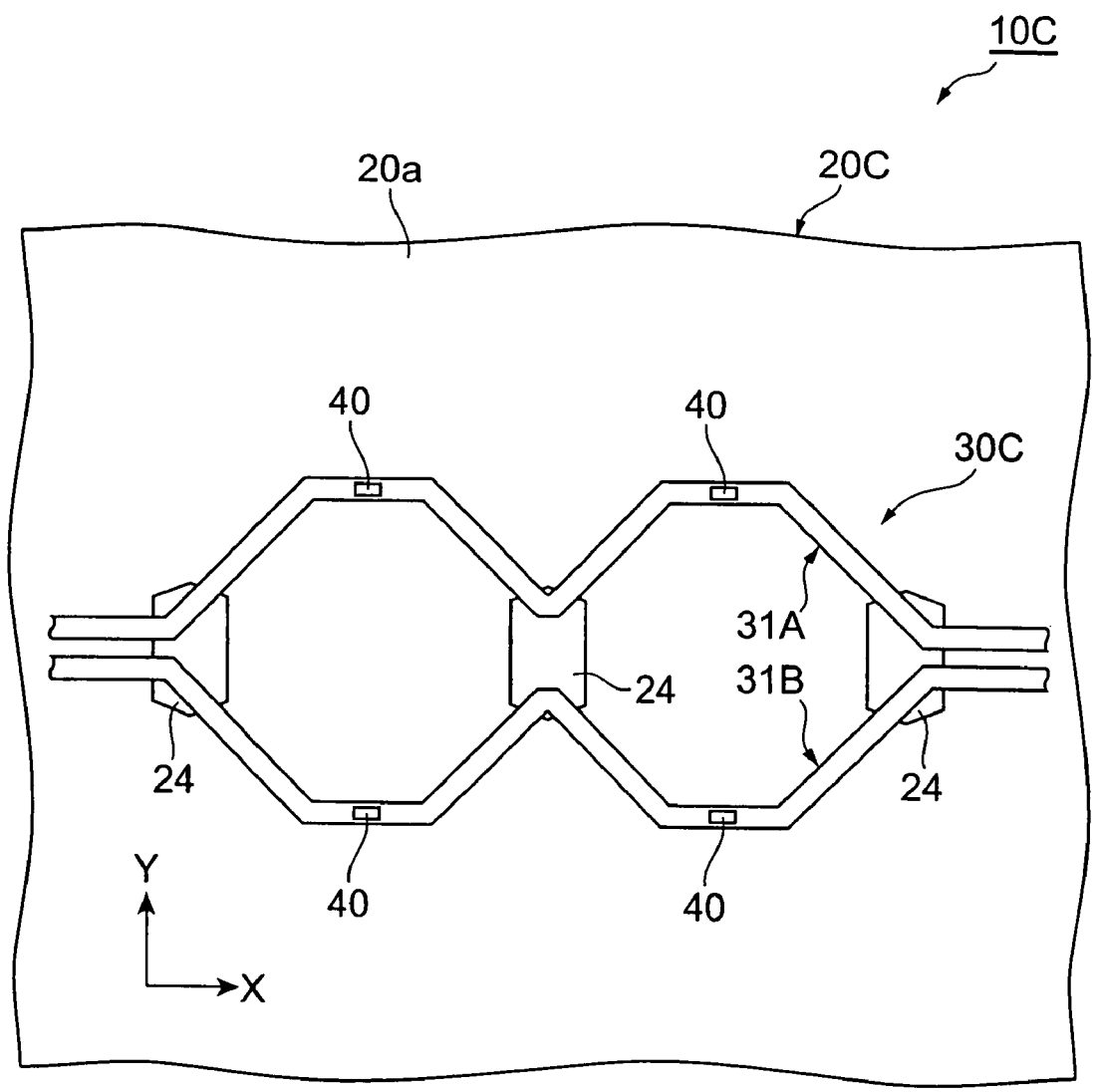
FIG. 10 is a schematic plan view showing a sensing unit according to a fourth embodiment of the present invention.

Next, a sensing unit 10C according to a fourth embodiment of the present invention will be described. FIG. 10 is a schematic plan view showing the sensing unit 10C.

As shown in FIG. 10, the sensing unit 10C has a spring portion 30C, and the spring portion 30C is formed by subjecting a conductive material to plating, similarly to the spring portions 30, 30A, and 30B. The spring portion 30C is constituted by a pair of spring portions 31A, 31B having a mirror-image relationship relative to the Y direction. The shape of each of the spring portions 31A, 31B is a continuation of the sensing unit 10A described above, and accordingly, the spring portions 31A, 31B are supported by three seating portions 24 arranged at equal intervals in the X direction. Between the two support portions 24, each of the spring portions 31A, 31B forming the spring portion 30C has an identical constitution to the spring portion 30A of the second embodiment, and therefore X direction oscillation is detected by the sensor portion 40.

In this embodiment, improvements in measurement precision and so on can be achieved by means of the plurality of sensor portions 40. For example, a higher degree of measurement precision can be realized by determining a difference in the displacement amount or an average displacement amount from the detection signal of each sensor portion 40.

The present invention is not limited to the embodiment described above, and may be subjected to various modifications. For example, the sensor portion is not limited to a GMR sensor, and may be changed appropriately to another well-known sensor (an MR sensor or the like). Furthermore, if necessary, the cross-section of the conductive spring portion may be divided into a plurality of parts using insulating film.

What is claimed is:

1. A sensing unit comprising:
   a substrate formed with a recessed portion;
   a spring portion formed from a conductive material and having a support portion provided on said substrate and a flat coil-shaped movable portion supported by said support portion so as to be capable of floating relative to said substrate; and
   a sensor portion provided on said movable portion of said spring portion, for detecting displacement in said movable portion and transmitting a signal relating to said displacement via said spring portion.

2. The sensing unit according to claim 1, wherein
   said support portion of said spring portion is positioned on an edge portion of said recessed portion, and
   said movable portion of said spring portion is positioned above said recessed portion.

3. The sensing unit according to claim 2, wherein said substrate is held so as to extend in a vertical direction.

4. The sensing unit according to claim 2, wherein said substrate is held so as to extend in a horizontal direction.

5. The sensing unit according to claim 1, wherein
   said support portion comprises a pair of support portions,
   two end portions of said movable portion are supported by said pair of support portions, and
   a part of said movable portion extends in an arrangement direction of said pair of support portions and oscillates in said arrangement direction.

6. The sensing unit according to claim 1, wherein said spring portion is formed by plating.

7. The sensing unit according to claim 1, wherein said sensor portion is constituted by a GMR sensor.

* * * * *